(12) United States Patent
Schultheis et al.

(10) Patent No.: US 9,075,214 B2
(45) Date of Patent: Jul. 7, 2015

(54) SHEATHED OPTICAL WAVEGUIDE AND METHOD FOR PRODUCING IT

(71) Applicant: Schott AG, Mainz (DE)

(72) Inventors: Bernd Schultheis, Schwabenheim (DE); Markus Kappel, Roxheim (DE)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 14/348,876

(22) PCT Filed: Sep. 27, 2012

(86) PCT No.: PCT/EP2012/069136
§ 371 (c)(1),
(2) Date: Mar. 31, 2014

(87) PCT Pub. No.: WO2013/045583
PCT Pub. Date: Apr. 4, 2013

(65) Prior Publication Data
US 2015/0049994 A1 Feb. 19, 2015

(30) Foreign Application Priority Data

Sep. 30, 2011 (DE) .......................... 10 2011 114 575

(51) Int. Cl.
*G02B 6/44* (2006.01)
*G02B 6/04* (2006.01)
(52) U.S. Cl.
CPC .............. *G02B 6/443* (2013.01); *G02B 6/4486* (2013.01); *G02B 6/04* (2013.01)
(58) Field of Classification Search
CPC ............................ G02B 6/4494; G02B 6/4475
USPC ......................................... 385/100, 106–112
See application file for complete search history.

(56) References Cited

U.S. PATENT DOCUMENTS

| 3,227,786 | A | 1/1966 | Cohen |
| 3,646,186 | A | 2/1972 | Hager |
| 4,699,579 | A | 10/1987 | Bourdon et al. |
| 4,937,029 | A | 6/1990 | Ishiharada et al. |
| 2011/0135816 | A1 | 6/2011 | Burns et al. |
| 2012/0310137 | A1* | 12/2012 | Silvestrini .................. 604/8 |

FOREIGN PATENT DOCUMENTS

| DE | 3802527 A1 | 8/1988 |
| DE | 4334232 A1 | 4/1995 |
| DE | 19608723 A1 | 9/1997 |
| DE | 19705920 A1 | 8/1998 |
| DE | 102005012689 B3 | 11/2006 |
| JP | 57141605 A | 9/1982 |

OTHER PUBLICATIONS

International Search Report dated Dec. 18, 2012 corresponding to PCT/EP2012/069136 with English translation, 6 pp.
German Office Action dated Jun. 5, 2012 corresponding to German Patent App. No. 10 2011 114 575.7, 13 pp.
English Translation of International Preliminary Report on Patentability of the International Searching Authority dated Apr. 1, 2014 corresponding to PCT/EP2012/069136.
English Translation of Written Opinion of the International Searching Authority dated Dec. 18, 2012 corresponding to PCT/EP2012/069136.

* cited by examiner

*Primary Examiner* — Ellen Kim
(74) *Attorney, Agent, or Firm* — Ohlandt, Greeley, Ruggiero & Perle, LLP

(57) ABSTRACT

Sheathed optical waveguides and methods for producing such waveguides are provided. The sheathing is provided so that the fibers of the waveguides do not adhere to the sheathing. To this end, elastomeric material is formed into a tube surrounding a bundle of fibers and is solidified. The tube is prevented from radial compressing the fibers during solidification of the elastomeric material by a fluid in the tube.

8 Claims, 6 Drawing Sheets

SHEATHED OPTICAL WAVEGUIDE AND METHOD FOR PRODUCING IT

The invention generally relates to optical waveguides and their manufacturing. More particularly the invention relates to sheathed optical waveguides.

Sheathings are used for both single fibers and fiber bundles in order to protect and mechanically stabilize the one or more optical fiber(s). Furthermore, in the case of side emitting fibers, the sheathing is used to create light effects, i.e. the sheathing typically has a visual function in this case.

From DE 197 05 920 C2, a method is known for manufacturing sheathed optical fiber bundles, in which the fiber bundle is introduced into an extruder where it is sheathed with an elastic material. As the elastic material, a high-temperature resistant silicone material is used, which is extruded around the optical fiber bundle as a tube. The silicone tube is stretched and then vulcanized, and the inner diameter of the stretched silicone tube is larger than the outer diameter of the optical fiber bundle.

When the silicone material is stretched it has not yet been crosslinked, so that until crosslinking it is still possible that fibers are embedded into the soft material. Therefore, there is a possibility that individual fibers become attached to the silicone sheathing. When the optical waveguide is subjected to mechanical stress, in particular bending, these fibers may then break. This may pose a problem in particular with quartz or glass fibers, due to the brittleness of these fibers.

Therefore, an object of the invention is to improve the sheathing of a fiber bundle so that adhesion of the fibers is avoided.

This object is achieved by the subject matter of the independent claims. Advantageous embodiments and modifications of the invention are set forth in the dependent claims. For this purpose, elastomeric material is formed into a tube surrounding the bundle and is solidified, and the tube is prevented from radial compression during solidification of the elastomeric material by means of a fluid in the tube.

Accordingly, the invention provides a method for producing a sheathed optical waveguide that comprises a plurality of light conducting fibers forming a bundle, the bundle being enclosed by a sheathing, wherein producing the sheathed optical waveguide comprises:
  guiding the bundle along the direction of longitudinal extension of the fibers through an opening of an extrusion tool while
  feeding elastomeric material from a nozzle orifice surrounding the bundle, so that the elastomeric material forms a tube surrounding the bundle; and
  feeding a fluid through at least one opening of the extrusion tool, which is arranged within the nozzle orifice, into the interior of the tube; and
  solidifying the elastomeric material at least on the inner wall of the tube in the area of the fluid, the solidifying of the elastomeric material being effected by crosslinking; and
  wherein the elastomeric material comprises a hot crosslinking elastomer, and the fluid is supplied at a temperature which results in hot-crosslinkage of the hot crosslinking elastomer; or
  wherein the elastomeric material comprises a chemically crosslinking elastomer, and the fluid supplies an agent for chemical crosslinking; or
  wherein the elastomeric material comprises an elastomer crosslinking by light, and light is injected into the interior of the tube. In other words, inside solidification is accomplished in the presence of the fluid or within an axial section of the tube in front of the nozzle of the extrusion tool, in which the fluid is provided.

In particular, the fluid serves to maintain a spacing between the bundle and the inner wall of the tube. This spacing prevents the light conducting fibers from becoming embedded into the elastomeric material and from adhering to the tube, at least until the elastomeric material at the inner surface of the tube has been sufficiently solidified to prevent embedding or adhering.

The apparatus for performing the method of the invention or for producing sheathed optical waveguides according to the invention has the features as follows. The apparatus comprises an extrusion tool having an opening for passing therethrough a bundle of light conducting fibers, and a nozzle orifice, typically of annular shape, that surrounds the opening for passing a bundle of light conducting fibers, and a feeding means for elastomeric material communicating with the nozzle orifice, wherein the apparatus comprises conveying means for passing the bundle through the opening of the extrusion tool while extruding the elastomeric material, and wherein the apparatus comprises fluid feeding means communicating with an opening arranged inside the nozzle orifice of the extrusion tool, so that during extrusion of the elastomeric material a fluid supplied by the fluid feeding means is introducible into a tube being formed by extrusion around the bundle in the area in front of the nozzle orifice of the extrusion tool, wherein means for crosslinking the elastomeric material is provided; and wherein
  the elastomeric material comprises a hot crosslinking elastomer, and the crosslinking means comprise heating means for supplying the fluid at a temperature which results in hot-crosslinkage of the hot crosslinking elastomer; or
  the elastomeric material comprises a chemically crosslinking elastomer, and an agent for chemical crosslinking is suppliable by the fluid; or
  the elastomeric material comprises an elastomer crosslinking by light, and the means for crosslinking the elastomeric material provides for injection of light into the interior of the tube.

Another particular advantage of the invention is that the method makes it possible to dispense with anti-sticking agents which otherwise would be used to prevent the light conducting fibers from adhering to the tube. According to one embodiment of the invention, therefore, the inner surface of the tube is free of anti-sticking agents. This is advantageous, because otherwise the anti-sticking agent would possibly impede conditioning of the optical waveguides, in particular processing of the optical fiber ends.

In the simplest case, the opening through which the bundle of optical fibers is passed through is at the same time used as the opening for supplying the fluid. According to another alternative or additional embodiment of the invention, the fluid is supplied via at least one separate opening.

The fluid is typically introduced into the tube under pressure in order to prevent the tube from firmly abutting the fibers of the bundle. Generally, slight overpressure will be sufficient. Since solidification of the tube occurs at the inner wall thereof while the fluid inflates the tube, a firm contact of the fibers of the bundle with the still soft elastomeric material is avoided, in particular embedding or adhesion thereon. It is also possible to blow a reactive medium into the fluid, which influences the crosslinking, e.g. a gas. Nevertheless, the elastomeric material will typically mold itself to the bundle so that textures, complementary or corresponding to the fibers, will be formed on the inner wall of the tube. In other words, imprints of fibers will arise at the tube's inner surface. However, the fibers will not adhere to the tube or the inner surface thereof. These imprints will occur even if the inner diameter of the tube is greater than the outer diameter of the bundle. The imprints may even have an extension of more than 3 m. However, according to one embodiment of the invention, a ratio of the inner diameter D1 of the tube to the outer diameter of the bundle is kept at less than 1.5, preferably less than 1.25. An air gap resulting between the fiber bundle and the inner surface of the tube is preferably from 0.1 to 0.3 mm.

This results in a product improved in several respects as compared to known sheathed optical waveguides. As mentioned above, fracture of the typically brittle fibers is avoided. This particularly applies when quartz or glass fibers are used as the light conducting fibers.

On the other hand, in contrast to a fiber bundle enclosed by a prefabricated silicone tube, it is possible to produce virtually unlimited lengths. By contrast, if a prefabricated silicone tube is pulled over a fiber bundle, the length of the optical fiber will naturally be limited. Typically, this method known from prior art only permits to produce lengths of several meters, typically up to a maximum of 6 meters. According to a modification of the invention, therefore, the optical waveguide according to the invention may have a length of at least 10 meters, preferably at least 20 meters, more preferably at least 100 meters.

The imprints and thus the texture in the inner surface of the tube have the further particular advantage that an engagement or contact area of the fibers is reduced as compared to a smooth inner surface, due to the texturing caused by the manufacturing process. This allows for easier displacement of the fiber bundle with respect to the tube's inner surface, and thus for improved flexibility.

By a specific surface treatment, such as roughening, of the extrusion tool, or by a corrugated profile of the surface of the extrusion tool, the surface texture of the elastomer sheathing forming the tube may be specifically influenced. Such a texture of the inner wall of the tube according to the invention in form of a wavy surface, for example, or a roughness of the elastomer sheathing, may advantageously promote the sliding behavior of the fiber bundle.

Another alternative for setting a desired sliding behavior of the fiber bundle in the tube is coating, preferably so-called in-line coating, of the fibers at the inlet into the extrusion tool or the extruder, or an introduction of a pasty or liquid coating mixture, known as top coat, into the interior of the tube together with the fluid that preferably acts as a supporting fluid. The coating mixture will be distributed on the surfaces in this case. In a crosslinking line it will react under elevated temperature and will form a sliding layer.

An in-line surface treatment using inert hydrophobic polymeric coating materials (parylenes) is another option for adjusting desired surface properties favorable in terms of sliding behavior of the fiber bundle. Preferably, this treatment is performed for medical items such as syringes in a vacuum coating chamber. However, such an in-line process would in principle also be conceivable under ambient air pressure.

Thus, the manufacturing method according to the invention permits to produce a sheathed optical waveguide comprising a plurality of light conducting fibers that form a bundle, wherein the bundle is enclosed by a sheathing in form of a tube consisting of or comprising crosslinked elastomeric material, and wherein the inner wall of the tube has imprints of the light conducting fibers, the light conducting fibers being neither materially bonded to the elastomer of the inner wall of the tube nor embedded in the inner wall.

Embedding of the fibers, here, refers to an integral material connection or positive fitting connection or frictional connection with the elastomer which prevents any movement of the fiber relative to the elastomer in the embedded region.

The crosslinking may be induced in the entire cross section of the tube while the fluid prevents adhesion and/or embedding of the fibers. In particular, however, crosslinking of the elastomeric material may initially be accomplished at the inner surface, and subsequently the entire cross section of the elastomeric material of the tube may be crosslinked. The latter embodiment is favorable to achieve high production speeds on the one hand and to particularly effectively prevent the fibers from embedding on the other hand.

Also conceivable, however, is to use thermoplastic elastomers as the elastomeric material, for example. In this case, solidification is achieved by cooling the hot extruded thermoplastic elastomeric material. Optionally, a non-elastomeric thermoplastic material may be used, as long as the flexibility of the optical waveguide will still suffice for the application. Relevant factors in this case, as with the elastomeric materials, include Shore hardness, Young's modulus, and the tube geometry.

Most easily a gas is used as the fluid, which may comprise a gas mixture. In particular, air may be used as the fluid in this case.

Further, particularly preferred as the elastomeric material is a silicone. Silicones are elastic over a wide temperature range, comparatively resistant to aging, generally flame resistant, and, in particular, they can be easily processed with the method according to the invention. Another advantage of this plastic material is excellent autoclave resistance, as it is possibly required for medical products. According to this embodiment of the invention, the elastomeric material of the tube accordingly comprises elastomeric silicone. In particular, for solidification, hot crosslinkage as described above may be accomplished using hot crosslinking silicone elastomers. In this case, hot air or another heated gas, e.g. heated inert gas may be supplied as the fluid. For example, nitrogen is suitable as an inert gas.

In order to achieve fast inside solidification of the tube, it is particularly advantageous to introduce a crosslinking agent into the interior of the tube during extrusion.

According to the invention, alternatively or in addition to the process-related measures during extrusion mentioned above, such as the use of a shock tunnel and injection of a hot fluid (supporting air) into the interior of the tube, a heat treatment (annealing) may be performed for a few hours at temperatures around 300° C., preferably for 4 hours at 299° C., as a subsequent process step. In this case, the sheathed optical waveguide previously wound onto a cable reel is unwound, cut to length, and subsequently treated in a thermal process. In this process, the degree of crosslinking of the elastomer, preferably silicone, is increased. Residual components of the crosslinking agent and optional other additives previously introduced, such as distribution oils, will diffuse to the surfaces, i.e. the tube's inner wall and the tube's outer surface. The increase of the crosslinking degree and the escape of oil will reduce the sliding friction of the fibers within the sheathing and the cable will become more supple. By dosing the amount of employed oil, a finishing process such as a fiber bonding or hot fusing process may be influenced according to the requirements. According to the invention, the dosage should be selected so that an adverse effect in form of schlieren on a side light effect optical waveguide is avoided.

According to yet another alternative or additional embodiment of the invention, a UV crosslinking elastomer may be used as the elastomeric material or as a component of the elastomer crosslinking by light. In this case, inside crosslinking of the elastomeric material may then be initiated by injecting ultraviolet light suitable for the crosslinking into the interior of the tube. According to one embodiment of the invention, this may be effected using the optical fibers. Injecting is particularly easy when side emitting optical fibers are used. Such optical waveguides are especially used for lighting applications.

Generally, the different types of crosslinking may be combined with each other. This particularly applies to further crosslinking of the remaining cross section of the tube following or during an initial rapid crosslinking of the elastomeric material at the inner wall of the tube.

Furthermore, the elastomeric material does not need to be homogeneous circumferentially. Rather, one option is co-extrusion or tandem extrusion of different elastomeric materials in different sectors of the nozzle orifice. According to this embodiment of the invention, a sheathed optical waveguide is produced, in which the tube has at least two sectors of different elastomeric materials. Different elastomeric materials does not necessarily mean different elastomers. Rather, the elastomeric materials may be different in terms of optional further additives, such as aggregates. For example, according to a refinement of this embodiment of the invention it is contemplated to mix a white or, more generally, a diffusely reflecting aggregate into the elastomeric material for one of the sectors. The elastomers themselves may be the same in the different sectors in this case. It is also possible to perform multiple extrusions in succession, for example as a tandem extrusion mentioned above, in order to provide different elastomeric materials in the radial direction and/or circumferential direction of the tube. In a tandem extrusion, two or more extrusions are performed continuously in one processing step, and additional process steps, such as printing, surface treatments, welting, etc. can be performed prior to, following, or between the extrusion steps.

Accordingly, a tube manufactured according to this embodiment of the method has a first sector of a transparent or translucent elastomeric material and a second sector of a diffusely reflecting white or, more generally, light elastomeric material to provide a reflector function. The diffuse reflectance and/or light appearance of the elastomeric material may especially be achieved using suitable additives, such as white pigments or metal particles. A sheathing with a tube formed in this manner is particularly advantageous in conjunction with side emitting light conducting fibers. The white or reflective sector will reflect the emitted light back, so that correspondingly more light will be emitted at the transparent or translucent side of the optical waveguide.

In case of light conducting fibers, when additionally adding flame retardants, for example, and other additives, an effect such as hazing of the tube has to be controlled by exact dosing. When selecting admixed ingredients, attention has to be paid to the natural colors, as these will be visible again when illuminating the tube. Especially flame retardant additives generally have a light beige coloring that may cause a yellowish tint of the illuminated tube later.

Furthermore, it is also possible to add other materials during extrusion. One example is to introduce metal elements during extrusion, such as metal strips. These may be used for reinforcement purposes, for example as an anti-kink protection, or as a reflector. Another example is to produce a welting or a tab during extrusion, which will allow for easier installation of the cable component when applied. For this purpose, a fabric or plastic strip may be supplied during extrusion, which then will bind to the elastomer. It is also possible to produce such welting from another co-extruded elastomer, in particular a co-extruded silicone of a higher Shore hardness than that of the tube.

According to yet another embodiment of the invention, the tube may be formed as a multilayer tube including a plurality of layers of different nature. According to a first refinement of this embodiment, an further plastic layer, for example of a thermoplastic material, may be applied onto or in the tube, preferably by a further extrusion step. This plastic layer may then serve as a reinforcement and anti-kink protection.

For example, a plastic, fabric, fiber, or metal reinforcement may be applied, such as in form of a spiral or a mesh, and may be embedded into a plastic material in a further extrusion step. Accordingly, in this embodiment of the invention, the tube comprises a radially first, inner layer of an elastomeric material which forms the inner wall, and a further layer including a reinforcement embedded into a plastic material, preferably an elastomer.

The invention will now be described in more detail by way of exemplary embodiments and with reference to the accompanying drawings. The same reference numerals in the figures designate the same or equivalent elements.

Figure 3:
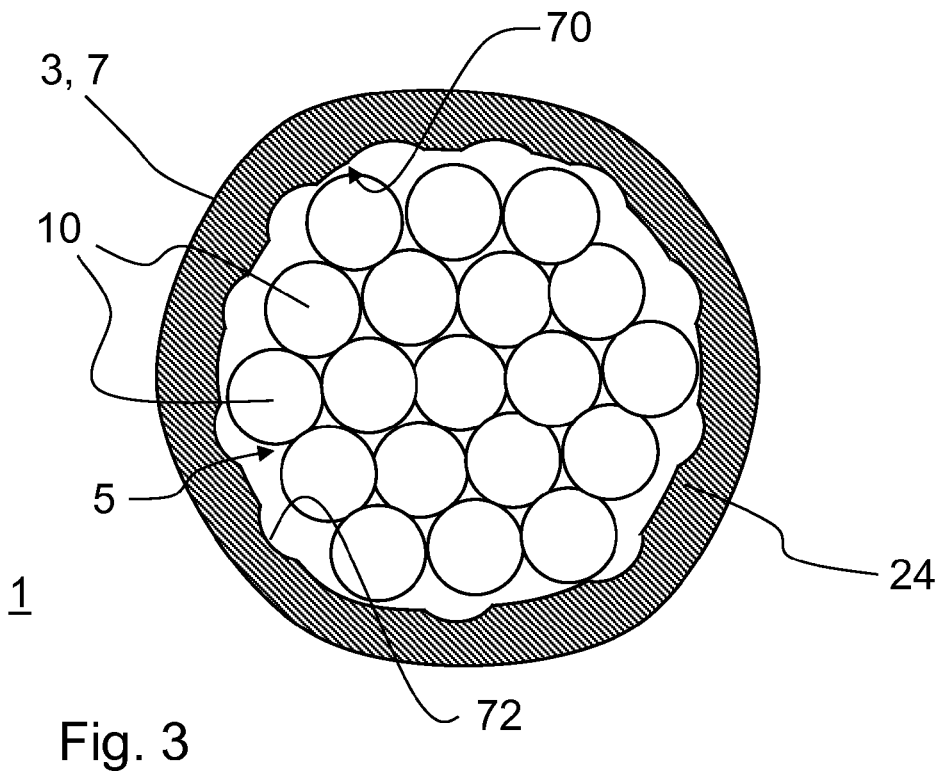
FIG. 3 is a schematic cross-sectional view through a sheathed optical waveguide according to the invention.
Figure 7:
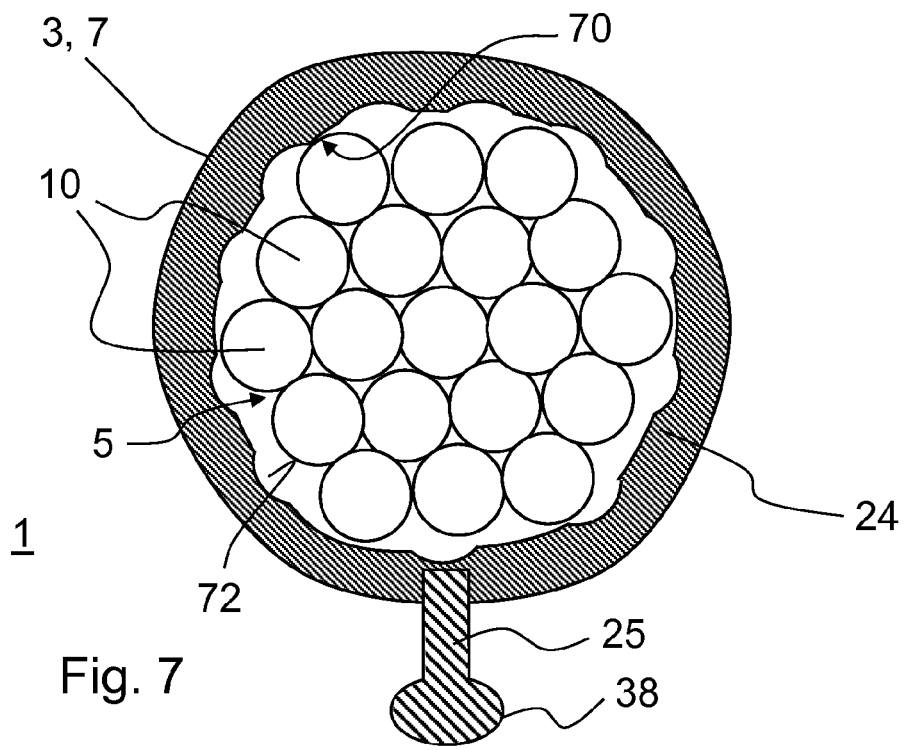
Figure 8:
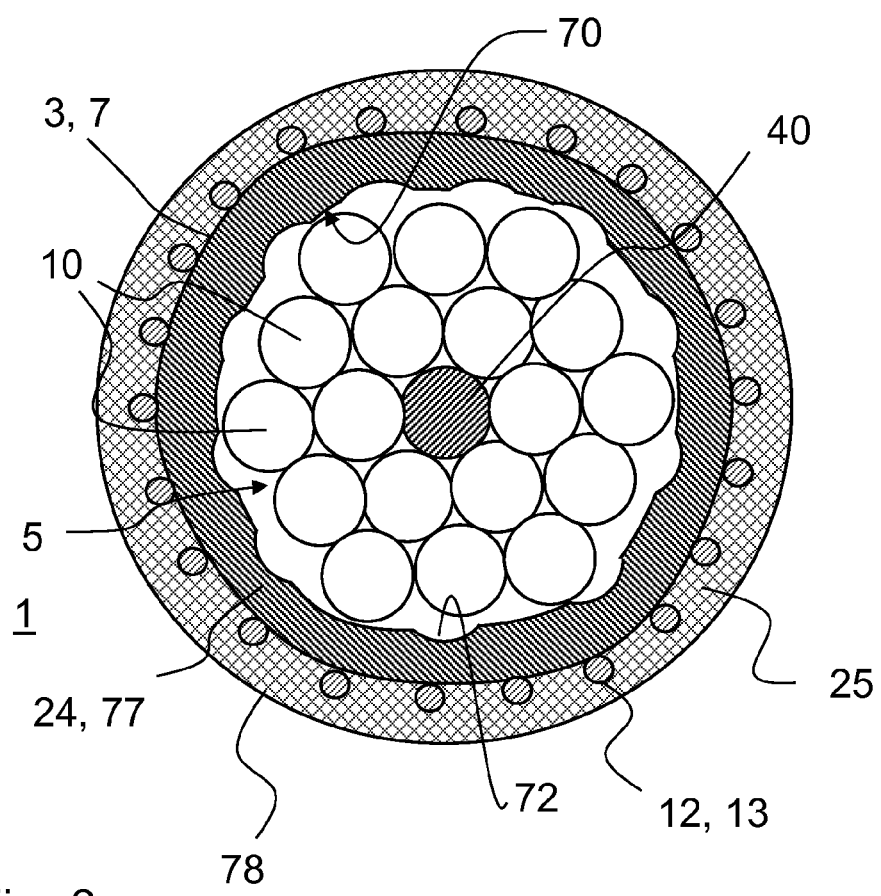
Figure 9:
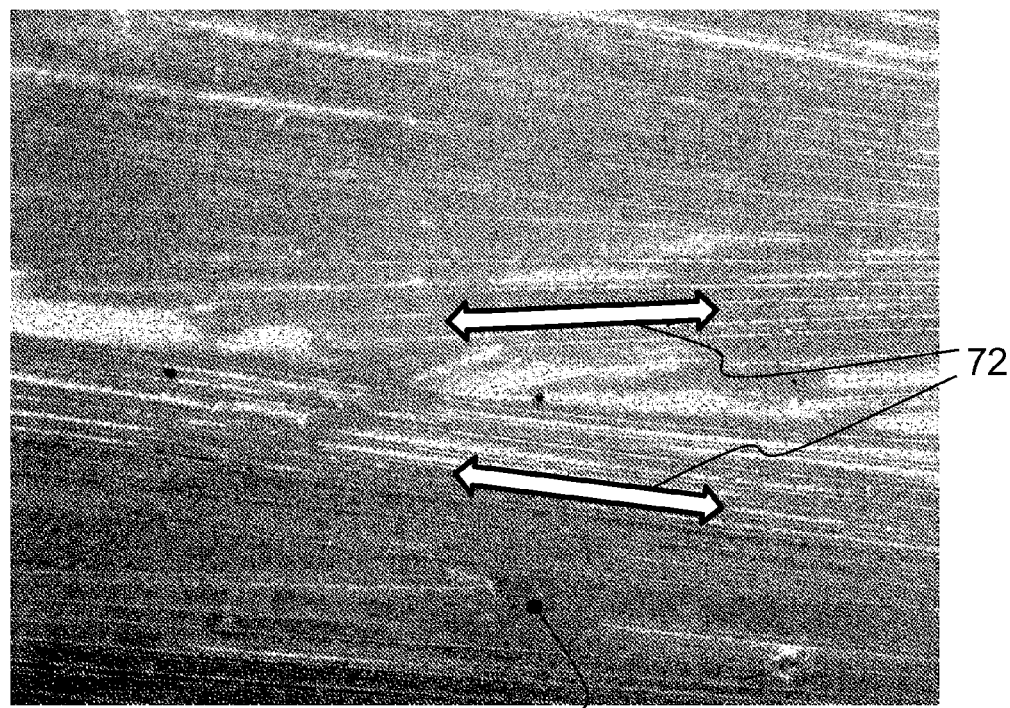
Figure 10:
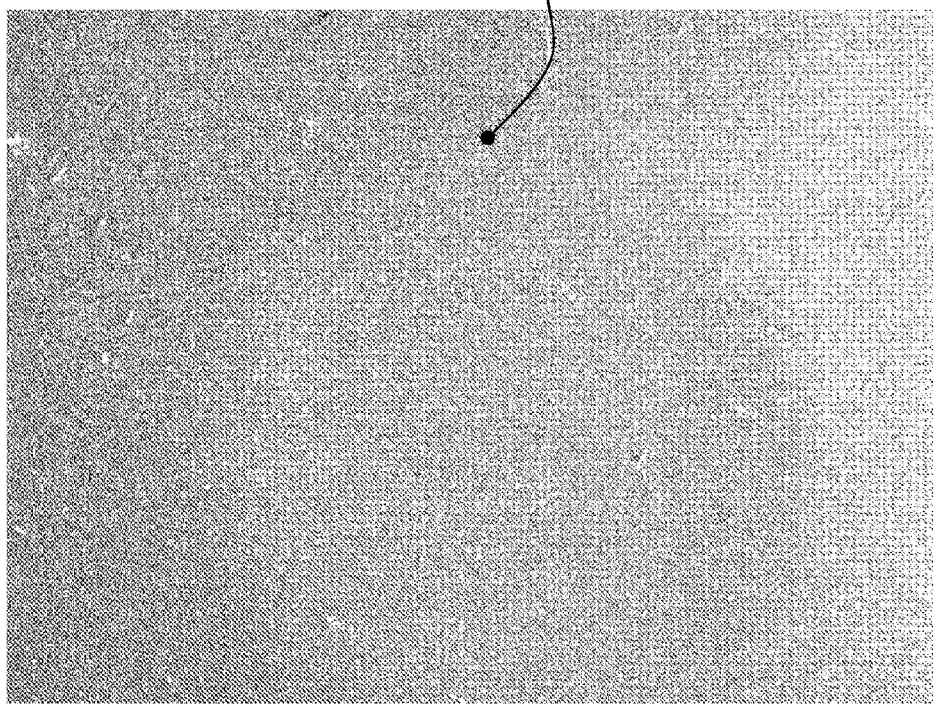

FIGS. 5 to 8 show variations of the sheathed optical waveguide 1 of FIG. 3; and FIGS. 9 and 10 are photographs of the inner wall 70 of silicone tubes.

Figure 1:
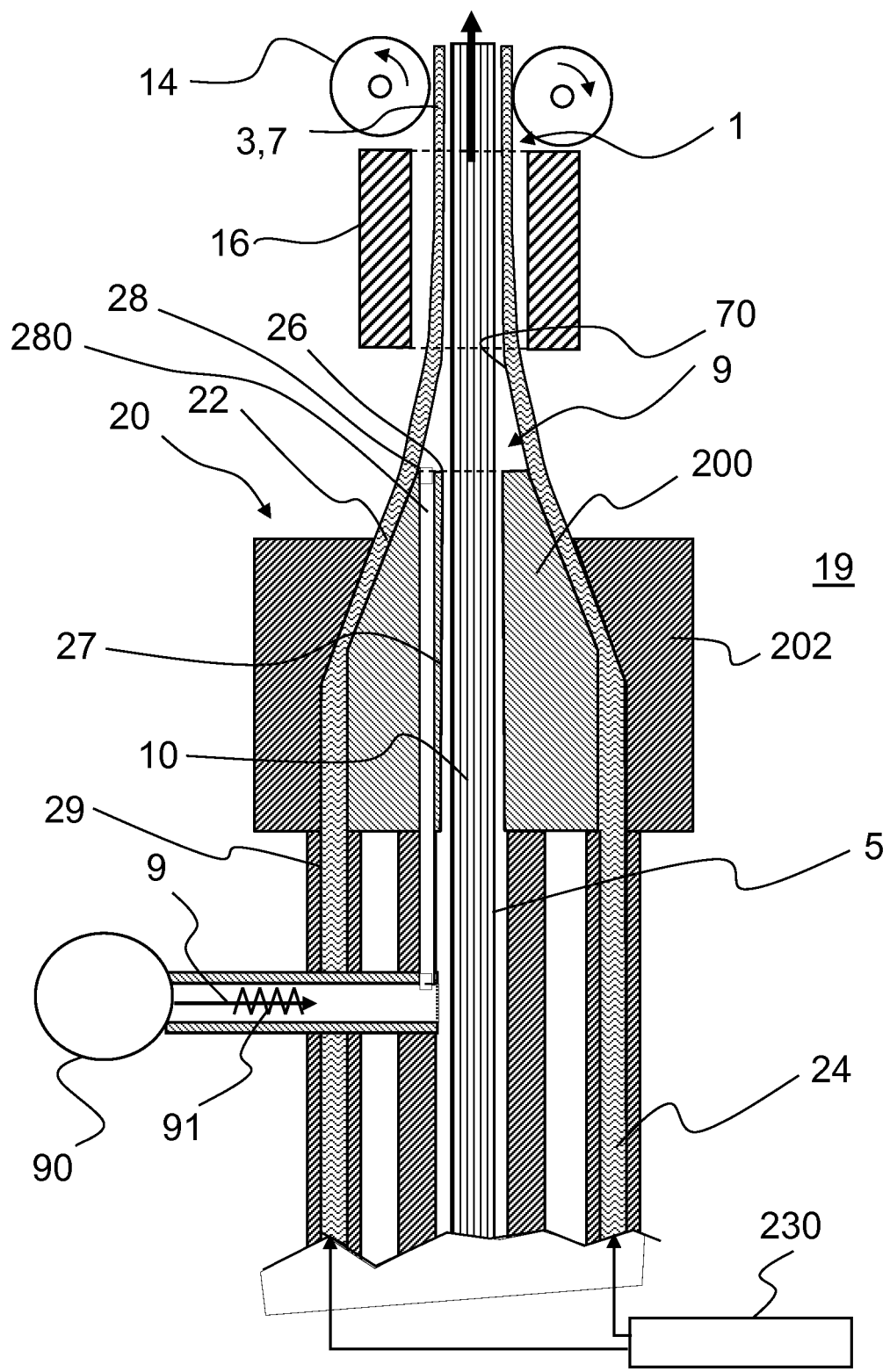
FIG. 1 is a partial view of an apparatus for performing the method for producing a sheathed optical waveguide.

FIG. 1 is a cross-sectional partial view of an apparatus 19 for performing the method according to the invention. Apparatus 19 comprises an extrusion head with an extrusion tool 20. Extrusion tool 20 comprises a mandrel 200 and a nozzle 202. Mandrel 200 of extrusion tool 20 is provided with an opening 26 through which a bundle 5 of light conducting fibers 10 is passed. For this purpose, a pulling device 14 as shown schematically may be provided as a conveying means, for example, in order to pass the bundle 5 through the opening 26 of the extrusion tool 20 during extrusion of the elastomeric material 24. Pulling device 14 is preferably disposed downstream of extrusion tool 20 in the direction of extrusion, for pulling the bundle 5 through opening 26 along the longitudinal extension of fibers 10. The pulling device may also be implemented by a cylinder winding up the sheathed optical waveguide 1.

Furthermore provided in extrusion tool 20 is a flow channel 29 opening into an annular nozzle orifice 22. Annular nozzle orifice 22 surrounds the bundle 5 of light conducting fibers 10. For this purpose, opening 26 and annular nozzle orifice 22 are arranged concentrically in the illustrated example. Annular nozzle orifice 22 is defined by a mandrel 200 arranged in an opening of nozzle 202.

While the bundle 5 of light conducting fibers 10 is passed through extrusion tool 20, elastomeric material 24 is fed to nozzle orifice 22 by feeding means 230, e.g. an extruder, and so elastomeric material 24 is extruded from annular orifice 22. As the extruded elastomeric material 24 is pulled away from extrusion tool 20 together with the bundle 5, a tube 7 is being formed from the elastomeric material 24 in front of extrusion tool 20, which tube encloses the bundle 5 as a sheathing 3 of optical waveguide 1.

Additionally, a fluid 9 is introduced into the interior of tube 7 in the area in front of extrusion tool 20 through at least one opening in the extrusion tool 20, which is provided within annular nozzle orifice 22, by fluid feeding means 90 communicating with opening 26, e.g. pumps or a pressurized media storage, which fluid will maintain a spacing between the bundle 5 and the inner wall 70 of tube 7 and will prevent tube 7 from radially compressing so that the inner wall will not firmly engage fibers 10 and the fibers are prevented from adhering or becoming embedded.

In the simplest case, as in the example shown in FIG. 1, the fluid 9 is supplied through the same opening 26 through which the bundle 5 of light conducting fibers 10 is led out from extrusion head 20. In the example shown in FIG. 1, for this purpose, pressurized fluid 9 is supplied to a channel 27 in which the bundle 5 is guided and which opens into opening 26. According to a refinement, the fluid flow towards opening 26 is adjusted or set to form an approximately laminar flow around bundle 5.

FIG. 1 additionally shows an alternative, in which the fluid 9 is supplied to the area in front of the extrusion tool 20 between tube 7 and bundle 5 via a fluid passage 280 and through a separate fluid opening 28. Of course, it is also possible to feed a fluid 9, or optionally two or more different fluids, through both, the opening 26 and a separate opening 28.

Further, the elastomeric material 24 emerging from annular nozzle orifice 22 and forming the tube 7 is solidified at the inner wall 70 of tube 7 in the presence of the fluid 9, while the fluid 9 within tube 7 maintains the spacing to the bundle 5 of light conducting fibers 10. Solidification is in particular accomplished by hot crosslinking of the elastomeric material 24, which for this purpose accordingly is or comprises a hot crosslinking elastomeric material. In particular, a hot crosslinking silicone elastomer may be used as the elastomeric material 24 for this purpose. Crosslinking is induced by the fluid 9 which, for this purpose, is discharged from opening 26 at a temperature sufficient for hot crosslinking of the elastomeric material. Initially, only a thin layer at the inner surface 70 of tube 7 is crosslinked. The spacing between the inner wall 70 of the tube and the bundle 5, which is maintained by the fluid 9 prevents the light conducting fibers 10 of the bundle from adhering to the elastomeric material 24 or even becoming embedded in the elastomeric material.

Preferably air is used as the fluid 9. Accordingly, in order to accomplish the crosslinking of the elastomeric material 24, hot air is used as the fluid 9 in the embodiment shown in FIG. 1. For heating the air, heating means 91 are provided. As shown, a heating coil in the supply conduit to extrusion tool 20 is suitable as a heating means 91, for example.

Preferred process parameters for this injection of supporting air (depending on the cable type, cable geometry, silicone type) are: a temperature range of the supporting air ranging from 175° C. to 220° C., and a pressure ranging from 50 to 80 mbar. This pressure range is also suitable for other fluids and/or crosslinking types, such as chemical or UV crosslinking.

For example, a supporting air temperature of 195° C. has proved to be advantageous for a cable outer diameter of 4 mm and a wall thickness of 0.5 mm with a silicone of Shore hardness 70A and a pulling rate of 5 m/min.

Accordingly, the hot air leaves the extrusion tool 20 through opening 26 together with the bundle 5 and prevents, by virtue of its excess pressure, that the silicone which simultaneously flows out from annular orifice 22 of the extruder collapses and adheres to the bundle 5. At the same time, by virtue of the hot air, the crosslinking process of the silicone elastomer is abruptly activated at the inner wall 70 of tube 7.

In order to prevent the elastomeric material 24 from already heating up in the extrusion tool 20 so much that crosslinking already starts therein, according to one refinement of the invention the channel 27 is thermally insulated from flow channel 29 for feeding elastomeric material 24 that opens into annular orifice 22. Otherwise, a heat transfer into the elastomeric material 24 would cause initiation of the crosslinking process already in the extrusion tool 20, which would result in inhomogeneities and degradation or even loss of material properties.

In particular, it is favorable to provide a good thermal insulation for mandrel 200, especially at the inner surface of the mandrel, since otherwise there would be a heat transfer to the elastomeric material 24 flowing therethrough. Accordingly, in the additionally illustrated embodiment with separate fluid passage 280 in mandrel 200 this fluid passage 280 may likewise be thermally insulated. Accordingly, in a modification of the invention without limitation to the specific example illustrated in FIG. 1, the extrusion tool comprises a mandrel 200 arranged in a nozzle 202, and mandrel 200 is provided with a fluid passage, which is thermally insulated from the outer surface of mandrel 200 around which the elastomeric material 24 flows when in operation. This fluid passage may either be the separate fluid passage 280 shown in FIG. 1, or the channel 27 which opens into opening 26. Suitable insulation materials include various plastics having good sliding properties, e.g. PTFE (polytetrafluoroethylene) "Teflon®", or POM (polyoxymethylene) "Delrin®". The type of insulation plastic materials used depends on the temperature of the supporting air, among others. PTFE has proved particularly useful, for its thermal stability and its excellent sliding properties. Accordingly, in one embodiment of the invention without limitation to the example shown in FIG. 1, annular orifice 22 is thermally insulated from the at least one opening 26 which is arranged within annular nozzle orifice 22 and through which the fluid 9 is supplied into the interior of tube 7. The insulation preferably comprises one of the plastic materials mentioned above, most preferably PTFE. In particular, mandrel 200 may be made of a plastic material such as PTFE, in order to reduce heat transfer from opening 26 into the elastomeric material in the extrusion tool 20.

With increasing distance from the extrusion tool, the fluid 9 is displaced and/or incorporated between bundle 5 and tube 7, at least partially, so that tube 7 will surround the bundle 5 more closely. Meanwhile, crosslinking is completed. For this purpose, in the example shown in FIG. 1 a crosslinking means 16 is provided, which is arranged in front of extrusion tool 20, or in other words, downstream extrusion tool 20 in the pulling direction of the bundle, for example in form of a heating ring, hot air blower, a salt bath for chemical crosslinking, or a UV light source for elastomeric materials crosslinking by light.

The configuration of extrusion tool 20, the pressure of the supporting air, the fluid temperature, in particular the temperature of the supporting air, and the quantity of the fluid are preferably adapted as a function of tube dimension, material properties, and pulling speed.

Appropriate values for process control and of the dimensions of the optical waveguides according to one embodiment of the invention are given below:
  Pulling rates: from 2 m/min to 200 m/min;
  Cable dimensions:
  The bundle 5 preferably has a diameter ranging from 0.5 millimeters to 12 millimeters.

The dimensions of tube 7 may preferably range from an outer diameter of 1.0 mm and an inner diameter of 0.6 mm for a bundle of 0.5 mm diameter to an outer diameter of 20 mm and an inner diameter of 16 mm for a bundle of 12.0 mm diameter.

It will be apparent from these exemplary embodiments that generally the inner diameter of tube 7 is slightly larger than the outer diameter of bundle 5. Despite of the larger inner diameter of tube 7 as compared to the outer diameter of bundle 5, there will be imprints of fibers 10 at the inner surface 70.

Typical sheathed optical waveguides produced by the present method and their application include:

EXAMPLE 1

Glass fiber bundle of 2.0 mm, with a fiber diameter of 53 µm; silicone sheathing of gray opaque silicone, e.g. WACKER Silpuran 8630/60, or Silpuran 4366.

EXAMPLE 2

Side emitting glass fiber bundle of 3.0 mm thickness, with a fiber diameter of 70 µm; silicone sheathing of translucent silicone, e.g. WACKER EL R 501/75 MH E. Such optical waveguides are suitable, inter alia, for contour lighting in the cabin section of aircraft, or for contour lighting in the exterior areas of vehicles, where an increased exposure to UV can be expected.

For the application as lighting in the cabin section of aircraft, silicones may be used which are marketed under the brands given below. These materials in compliance with aerospace standard ABD0031 include, among others: ELASTOSIL® R 401/80 MH E; POWERSIL® MH 310 E; ELASTOSIL® R plus 4366/60; ELASTOSIL® R 501/75 MH E of Wacker Chemie; and Addisil® 2080 E, and Silplus® EX80 of Momentive Performance Materials.

According to a variation of the examples described above, a chemically crosslinking elastomer is used as the elastomeric material 24, and an agent which initiates crosslinking of the elastomeric material 24 is mixed to the fluid, or such an agent is used as the fluid 9.

Figure 2:
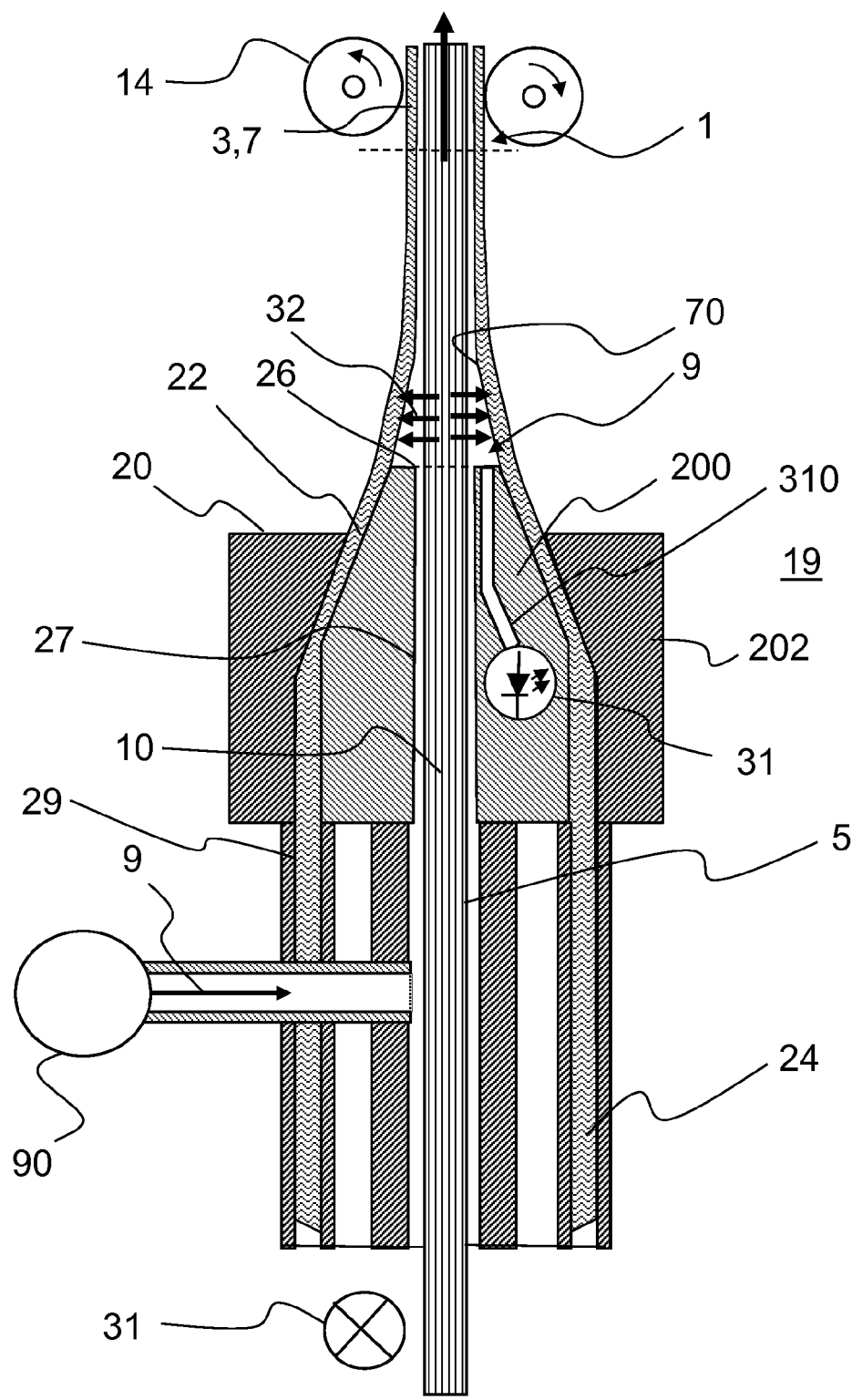
FIG. 2 shows a variation of the embodiment shown in FIG. 1.

Yet another variation is illustrated in FIG. 2. Here, an elastomeric material which is crosslinkable using UV light is used as the elastomeric material 24. The light conducting fibers 10 are so-called side emitting fibers in this case. These include scattering elements along their longitudinal extension, which scatter out the light conducted in the fiber. Fiber bundles including such side emitting fibers find application for lighting purposes. On the other hand, this property of fibers 10 enables to inject the light used for crosslinking.

For crosslinking, the light, preferably blue or ultraviolet light, is injected from a light source 31 and is transmitted along fiber bundle 5. The light 32 which exits inside tube 7 causes crosslinking and solidification of the elastomeric material 24 in the region in which the inner wall 70 of tube 7 is maintained at a distance from bundle 5 by the fluid 9. According to yet another embodiment of the invention, the mandrel 200 includes a light source 31, e.g. in form of a UV LED or a blue LED, for crosslinking the elastomeric material 24 in the area in front of mandrel 200. For example, to this end, mandrel 200 may be adapted to guide the light through mandrel 200 to inject it into the elastomeric material to be crosslinked at the end of the mandrel. For example, for this purpose, similarly to the embodiment illustrated in FIG. 1, a light conducting channel may be provided in mandrel 200 instead of the fluid passage 280 shown there. According to yet another embodiment of the invention, mandrel 200 may be made of a material that is transparent for the light to be injected.

As shown in FIG. 2, light source 31 may be arranged in mandrel 200, and may, as illustrated, inject the light via a light conducting channel 310 into the region in which crosslinking is to be accomplished. Even with a light source 31 arranged outside mandrel 200, such a light conducting channel may be provided in the mandrel for injecting the light into the area in front of extrusion tool 20, in which the fluid 9 is provided between tube 7 and bundle 5, for crosslinking the elastomeric material. Accordingly, with these embodiments of light sources 31, the mandrel 200 comprises at least one light conducting channel. Yet another possibility is to provide the light source 31 directly at the end of the mandrel. Compact light sources 31 suitable to be integrated in mandrel 200 in particular include semiconductor light sources, such as light emitting diodes or laser diodes. These two latter embodiments thus have in common that the light source 31 is arranged in the mandrel 200.

Generally, for stabilizing the elastomeric tube in view of the further processing, the crosslinking process of the elastomeric material 24 is enabled and/or completed by means of suitable crosslinking systems, such as a salt bath, hot air tunnel, IR radiators, or UV light. The different possibilities of crosslinking may be combined for crosslinking the inner surface and further crosslinking the entire tube cross section.

FIG. 3 schematically illustrates a cross section of a sheathed optical waveguide 1 producible by the method according to the invention. The bundle 5 of light conducting fibers 10 is enclosed by a sheathing 3 in form of a tube 7. The inner wall 70 follows the contour of the bundle. In particular, imprints 72 of the light conducting fibers 10 have been formed in the inner wall 70 due to the manufacturing process. Though fibers 10 typically closely engage the inner wall 70 of tube 7, or still are spaced slightly therefrom, as in the exemplary embodiments mentioned above, they are however not naterially bonded to the elastomer of tube 7, preferably a silicone, nor are they embedded in the inner wall 70. Since the tube is movable relative to the fibers 10 or the bundle 5, the positions of imprints 72 will generally not correspond to the positions of those fibers 10 which have caused the imprints 72. However, as can be seen from FIG. 3, imprints 72 define a relief texture of the inner wall 70, which reduces the contact area of the elastomeric material 24 to the fibers 10. This leads to an increased flexibility of the entire optical waveguide, since when bending the optical waveguide 1 the fibers 10 are easier displaced relative to the inner wall 70.

Generally, wall thicknesses of the tube 7 in a range from 0.1 mm to 1 mm, typically from 0.2 mm to 0.6 mm are preferred.

According to yet another refinement of the invention, bundle 5 preferably has a diameter in a range from 0.5 mm to 10 mm, typically from 1 mm to 5 mm.

Generally, without limitation to the specific embodiment of FIG. 3, the light conducting fibers 10 of bundle 5 may be arranged in parallel, or may be twisted, stranded, or interlaced. The latter possibilities are possibly advantageous to make the bundle 5 either more flexible and pliable (especially during stranding), or even stiffer.

Further, a sizing may be provided for holding the fibers 10 of the bundle 5 together and/or for preventing adhesion of the fibers 10 to the inner surface of the tube. Suitable for sizing are a stearic acid/alcohol mixture, fluoroalkyl silane (FAS) dissolved in alcohol, a stearic acid/alcohol mixture with an additional adhesive component, for example.

According to yet another embodiment of the invention, the fibers 10 of the bundle 5 may be enclosed by and/or embedded in a binding agent, such as a synthetic resin.

Moreover, additional flame-retardant substances may be included in the elastomeric material 24 of tube 7. In this way, the requirements pursuant to FAR 25.853 (FAA, U.S.), and the Flame, Smoke density, and Toxicity (FST) requirements as demanded by aircraft manufacturers can be met.

Figure 4:
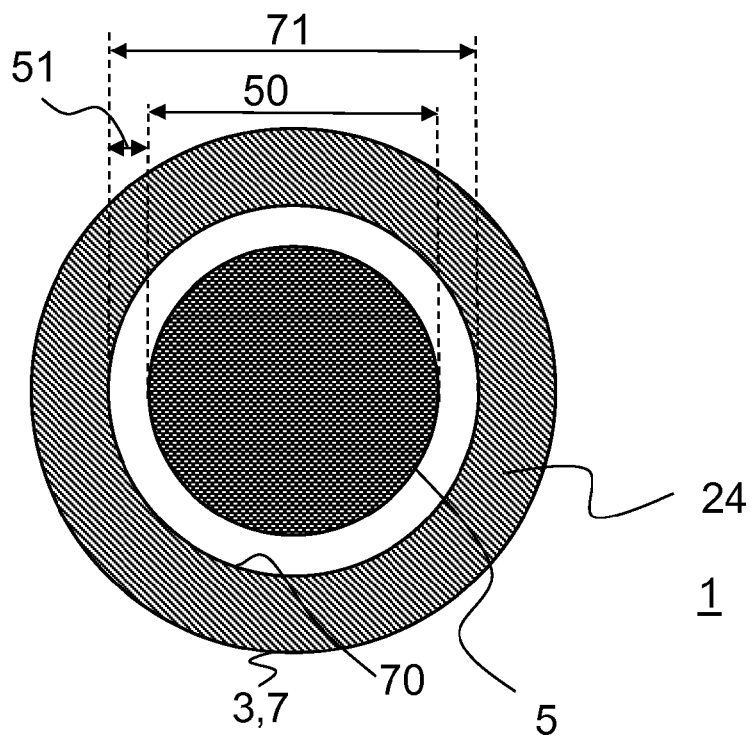
FIG. 4 is a cross-sectional view through an optical waveguide, in which the tube has an inner diameter which is larger than the outer diameter of the bundle.

FIG. 4 again shows a cross-sectional view through a sheathed optical waveguide 1, with the bundle 5 illustrated with an idealized circular cross section. As can be seen from FIG. 4, the inner diameter 71 of tube 7 is greater than the outer diameter 50 of bundle 5, due to the crosslinking occurring while the fluid 9 prevents adhesion of the elastomeric material 24 to the bundle 5. Accordingly, a spacing 51 is resulting between bundle 5 and the inner wall 70 of tube 7. Preferably, however, as in the example illustrated, the difference between the diameters is small. Specifically, the ratio of the inner diameter 71 of the tube to the outer diameter 50 of the bundle is less than 1.5:1, preferably less than 1.25:1.

Figure 5:
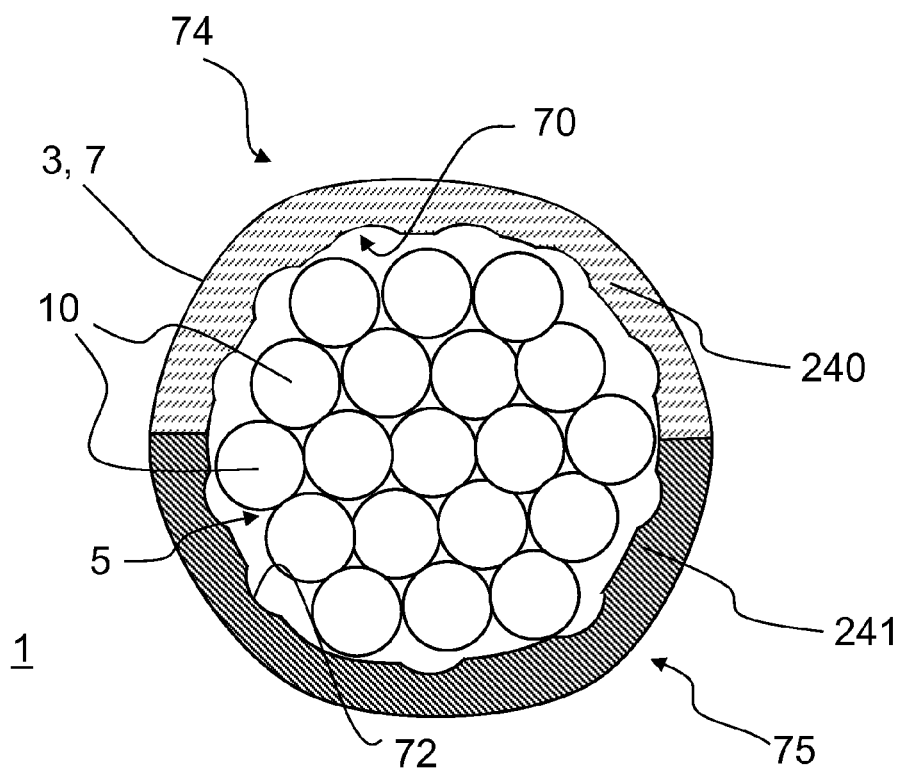

FIG. 5 shows a variation of the sheathed optical waveguide 1 shown in FIG. 3. In this variation, tube 7 has a first sector 74 of transparent elastomeric material 240, and a second sector 75 of diffuse reflective or white elastomeric material 241. For producing such a sheathing 3 in form of a two-section tube, a corresponding two-section annular nozzle orifice 22 may be used, with separate feeding channels for the different elastomeric materials 240, 241.

In the example shown in FIG. 5, the two sectors 74, 75 are of about the same size, so that each one comprises an angular range of approximately 180°. The embodiment of the invention shown in FIG. 5 is particularly suitable as a linear light source, when side emitting fibers 10 are used. The light emitted by fibers 10 toward sector 75 will be diffusely reflected on the white elastomeric material 241 and can then be emitted through the transparent elastomeric material 240. When such a sheathed optical waveguide 1 is used for lighting, for example to highlight edges or to indicate paths, it will then be favorable to fix the optical waveguide in the correct orientation so that the light emitting sector 74 faces the desired direction. This may for example be achieved using a welting. In the other embodiments of the invention, a welting may likewise be provided in order to facilitate laying and fixing of the optical waveguide 1.

Figure 6:
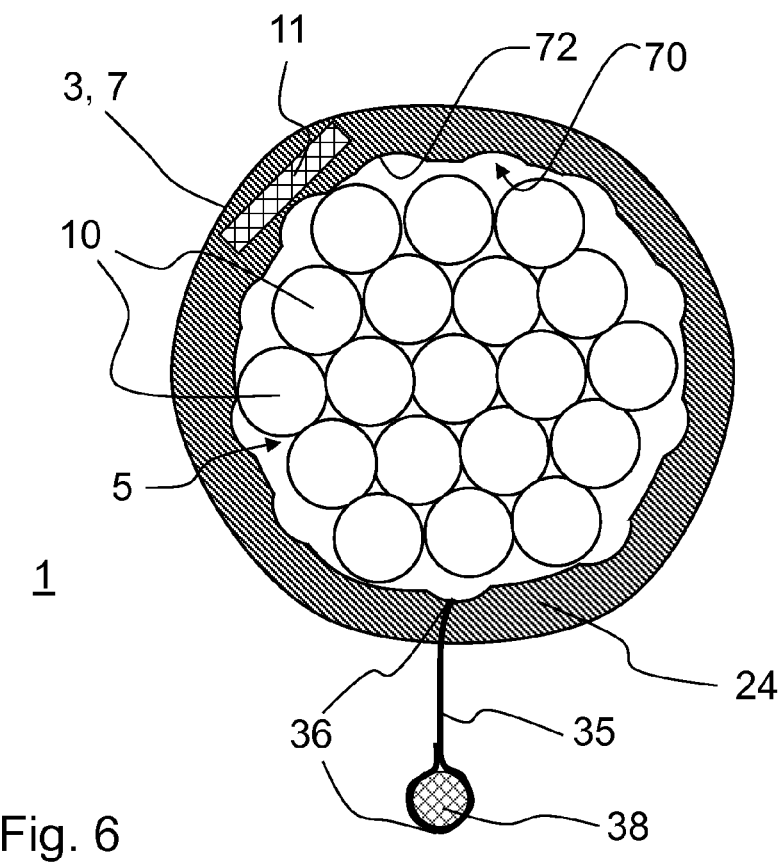

FIGS. 6 and 7 show two of such variations of the embodiment shown in FIG. 3. In the example illustrated in FIG. 6, a tab 35, for example in form of a fabric tab, is embedded in tube 7 with one of its edges 36. The other edge 36 of tab 35 is provided with a welting 38. With the welting 38, optical waveguide 1 will be fixed quickly and easily in a suitable holder, such as a welting rail.

For manufacturing, tab 35 is passed through the extrusion tool 20 together with the bundle 5 of light conducting fibers 10 while elastomeric material 24 is extruded. For example, in the embodiment shown in FIG. 1, a slot may be provided adjacent to or opening into annular nozzle orifice 22, through which tab 35 is passed.

According to another variation that is also illustrated in FIG. 6, a reinforcing strip may be incorporated into tube 7 upon extrusion. For example, for this purpose, a metal strip 11 may be embedded into sheathing 3. With such a reinforcement, anti-kink protection and/or strain relief can be achieved for bundle 5. Of course, such a reinforcement may also be employed in the other embodiments of optical waveguides 1 according to the invention presently described. Such a metal strip 11 may also be used as a reflector when using side emitting fibers. It is also possible to use other materials as reflectors, such as white or diffuse reflecting strips.

The variation shown in FIG. 7 also includes a welting 38, however, in this case the welting is made of co-extruded material, e.g. of an elastomeric material 25 having a greater Shore hardness than the elastomeric material 24 of the tube. Again, this embodiment of the invention may be produced by an appropriately configured extrusion tool 20.

In the exemplary embodiments described so far, the sheathed optical waveguide 1 has a substantially round cross section. However, the inventive method also allows to easily and readily produce other and more complex cross-sectional geometries. As examples, square or even T-shaped cross sections may be mentioned. Sheathed optical waveguides of such shapes are particularly advantageous in terms of easy installation.

FIG. 8 shows, as another example, an optical waveguide 1 with a multilayer sheathing 3. Here, tube 7 has a radially first, inner layer 77 of an elastomeric material 24. Inner layer 77 defines the inner wall 70 of tube 7. A reinforcement 12 is applied on inner layer 77 and is embedded in a plastic material, preferably an elastomer 25. The reinforcement may comprise a fabric or mesh 13. Alternatively, a plastic or metal spiral may be wound around inner layer 77 and then be embedded in the plastic material or elastomer 25, as the reinforcement 12.

For manufacturing, in a first step extrusion is performed with a silicone sheathing, as it has been described with reference to FIG. 1 or FIG. 2. Then, a plastic or metal mesh 13 or a plastic or metal spiral is applied, and in a second extrusion step an outer silicone sheathing is applied. For this step, again, an apparatus similar to that of FIG. 1 or FIG. 2 may be used, except that a fluid 9 will not be needed when the outer layer 78 is to be firmly connected to the inner layer 77.

This embodiment of the invention allows for an automated production of mechanically reinforced fiber-optic cables with integrated anti-kink protection, with strain relief, and/or with kick protection. A possible application of such sheathed optical waveguides is, for example, for optical fiber components of endoscopes. Complex manual assembly is eliminated, and moreover, reinforced fiber-optic cables can easily be produced in lengths of considerably more than 2.5 m, which is a limit in length for current conventional methods.

Further, the bundle 5 need not include only light conducting fibers 10. Rather, in a modification of the invention, and as shown in FIG. 8, the bundle may additionally include electrical conductors. FIG. 8 illustrates a single electrical conductor 40. But it is of course possible to provide a plurality of conductors.

In the exemplary embodiments of the invention described before, such electric conductors 40 may also be provided. Therefore, according to one modification of the invention without limitation to the specific exemplary embodiments illustrated, a sheathed optical waveguide 1 according to the invention is provided, in which the bundle 5 of light conducting fibers 10 includes at least one electrical conductor 40.

FIGS. 9 and 10 are two reflected light images of the inner wall 70 of silicone tubes. FIG. 9 shows the inner wall 70 of a tube 7 which was produced according to the method of the invention. The tube shown in FIG. 10 was also produced by extrusion of silicone elastomer, but without any fluid 9, and without simultaneously passing a bundle 5 of light conducting fibers 10 through the extrusion tool 20.

As can be seen from FIG. 9, the inner wall 70 shows clear imprints 72 of the fibers 10. These imprints 72 have the shape of grooves. For clarity, two of these grooves are indicated by double arrows. The edges of the grooves or imprints 72 may be identified as bright lines, due to the illumination.

By contrast, the surface of inner wall 70 of the example shown in FIG. 10 appears more or less free of any texture and smooth. A prefabricated tube which is subsequently pulled over a fiber-optic bundle will have a similar texture. Therefore, it can be seen from FIGS. 9 and 10, that sheathed optical waveguides 1 produced according to the invention can unambiguously be distinguished from optical waveguides produced in other ways.

It will be apparent to those skilled in the art that the invention is not limited to the exemplary embodiments illustrated in the figures but may be modified in many ways without departing from the scope of the appended claims. In particular, the individual features of the exemplary embodiments may be combined. For example, a reinforcing element such as that shown in FIG. 6 may also be used in all of the other exemplary embodiments.

Furthermore, a plurality of such elements may be provided. Also, it is possible in all of the embodiments of the invention to have electrical conductors 40 integrated in the bundle 5, for example. Moreover, it is also conceivable to provide such conductors 40 in the sheathing 3.

LIST OF REFERENCE NUMERALS

1 Optical waveguide
3 Sheathing
5 Bundle
7 Tube
9 Fluid
10 Light conducting fibers
11 Metal strip
12 Reinforcement
13 Mesh
14 Pulling device
16 Crosslinking means
19 Apparatus for producing a sheathed optical waveguide 1
20 Extrusion tool
22 Nozzle orifice 24, 25
240, 241 Elastomeric material
26 Opening
27 Channel
28 Separate fluid opening
29 Flow channel
31 Light source
32 Emitted light
35 Tab
36 Edge of 35
38 Welting
40 Electrical conductor
50 Outer diameter of 5
51 Spacing between 5, 70
70 Inner wall of 7
71 Inner diameter of 7
72 Imprints of light conducting fibers 10 in 70
74, 75 Sectors of 7
77 Inner layer of 7
78 Outer layer of 7
90 Fluid feeding means
91 Heating means
200 Mandrel
202 Nozzle
230 Elastomeric material feeding means
280 Fluid passage
310 Light conducting channel

The invention claimed is:

1. A sheathed optical waveguide, comprising:
a plurality of light conducting fibers forming a bundle; and
a sheathing of a tube of crosslinked elastomeric material surrounding the bundle, the tube having an inner wall having imprints of the light conducting fibers thereon, the light conducting fibers are neither materially bonded to the crosslinked elastomeric material at the inner wall nor embedded in the crosslinked elastomeric material at the inner wall.

2. The waveguide as in claim 1, wherein the crosslinked elastomeric material comprises an elastomeric silicone.

3. The waveguide as in claim 1, wherein the tube has a ratio of an inner diameter to an outer diameter of the bundle of less than 1.5.

4. The waveguide as in claim 1, wherein the inner wall of the tube has a texture.

5. The waveguide as in claim 1, wherein the inner wall of the tube has a corrugated texture.

6. The waveguide as in claim 1, wherein the tube has at least two sectors of different elastomeric materials.

7. The waveguide as in claim 6, wherein the tube has a first sector of a transparent elastomeric material and a second sector of a diffusely reflecting elastomeric material.

8. The waveguide as in claim 6, wherein the tube has a radially first, inner layer of an elastomeric material that defines the inner wall and a further layer including a reinforcement embedded into a plastic material.

* * * * *